Figure 1:
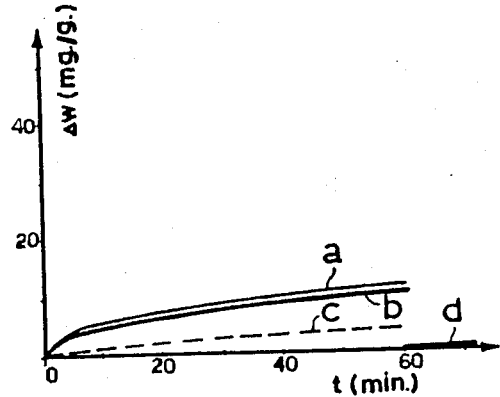

United States Patent [19]

Barosi et al.

[11] Patent Number: 4,907,948
[45] Date of Patent: Mar. 13, 1990

[54] NON-EVAPORABLE TERNARY GETTERING ALLOY, PARTICULARLY FOR THE SORPTION OF WATER AND WATER VAPOR IN NUCLEAR REACTOR FUEL ELEMENTS

[75] Inventors: Aldo Barosi; Claudio Boffito, both of Milan, Italy

[73] Assignee: SAES Getters S.p.A., Milan, Italy

[21] Appl. No.: 380,360

[22] Filed: May 20, 1982

Related U.S. Application Data

[63] Continuation of Ser. No. 115,019, Jan. 24, 1980, abandoned.

[30] Foreign Application Priority Data

Feb. 5, 1979 [IT] Italy .................. 19903 A/79

[51] Int. Cl.$^4$ .................. G21C 3/00; F04B 37/02
[52] U.S. Cl. .................. 417/53; 417/48; 376/418
[58] Field of Search .................. 417/53, 48, 51; 376/418

[56] References Cited

U.S. PATENT DOCUMENTS

| | | | |
|---|---|---|---|
| 1,151,160 | 8/1915 | Brown | 75/177 |
| 1,864,084 | 6/1932 | Miller | 252/181.2 |
| 2,926,981 | 3/1960 | Stout et al. | 75/177 |
| 3,141,830 | 7/1964 | Klepfer et al. | 176/68 |
| 3,969,185 | 7/1976 | Ross et al. | 252/181.6 |
| 4,118,542 | 10/1978 | Walter | 252/181.6 |
| 4,119,488 | 10/1978 | Barosi | 176/68 |
| 4,126,449 | 11/1978 | Tanner et al. | 75/177 |
| 4,153,484 | 5/1979 | Gamo et al. | 75/177 |
| 4,164,420 | 8/1979 | Armand et al. | 75/177 |
| 4,200,460 | 4/1980 | Grossman et al. | 75/177 |

FOREIGN PATENT DOCUMENTS

| | | | |
|---|---|---|---|
| 1084030 | 6/1960 | Fed. Rep. of Germany | 75/177 |
| 1011259 | 11/1965 | United Kingdom | 252/181.6 |

Primary Examiner—Harvey E. Behrend
Attorney, Agent, or Firm—David R. Murphy

[57] ABSTRACT

The scope of the present invention is the provision of a non-evaporable gettering ternary alloy particularly for the sorption of water and water vapor in nuclear reactor fuel elements.

The ternary gettering alloy has a composition which when plotted on a ternary composition diagram in weight percent Zr, weight percent Ti and weight percent Fe lies within a polygon having as its corners the points defined by
(a) 75% Zr—5% Ti—20% Fe
(b) 60% Zr—5% Ti—35% Fe
(c) 45% Zr—20% Ti—35% Fe
(d) 75% Zr—20% Ti—5% Fe 7 Claims, 4 Drawing Sheets

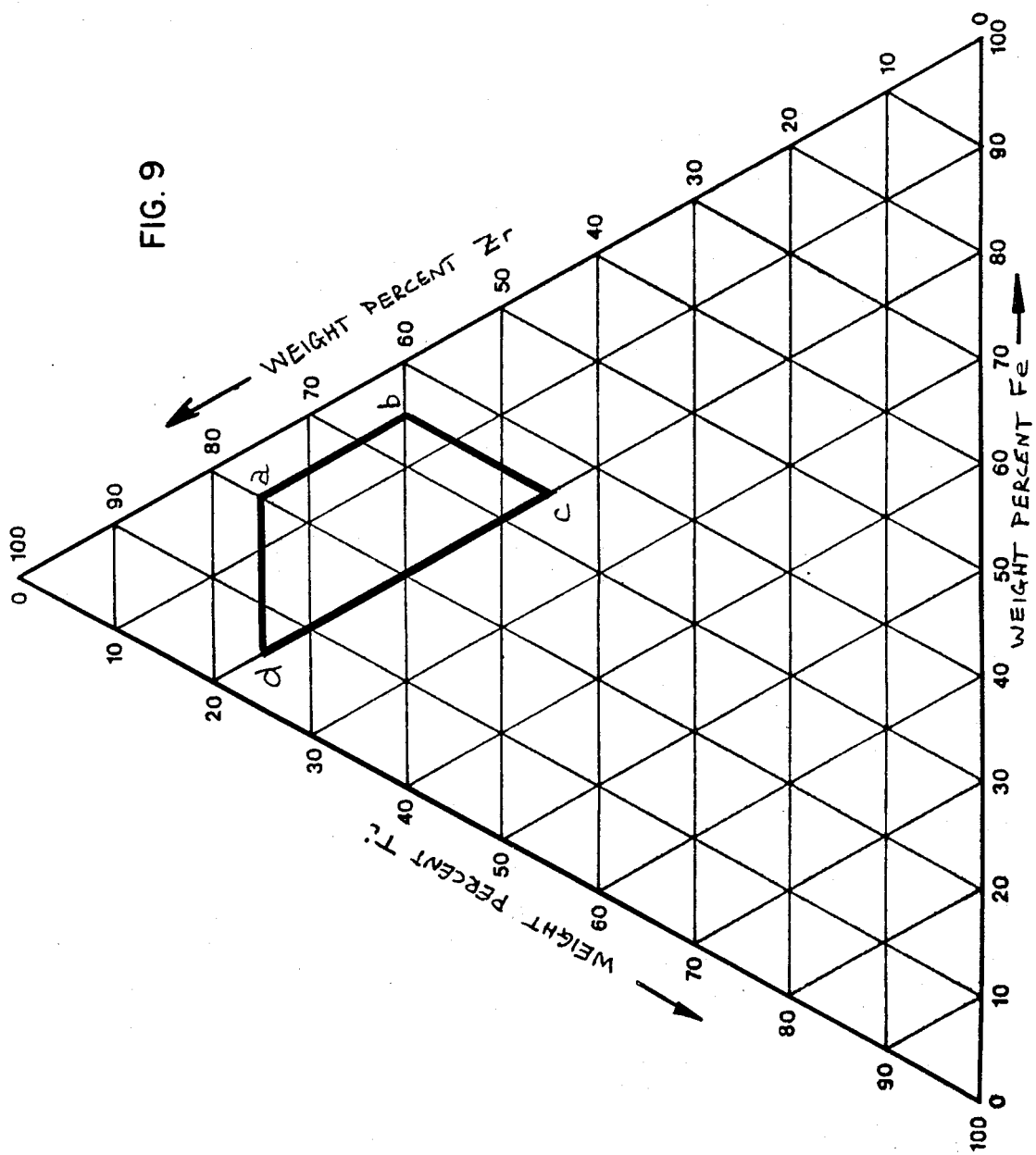

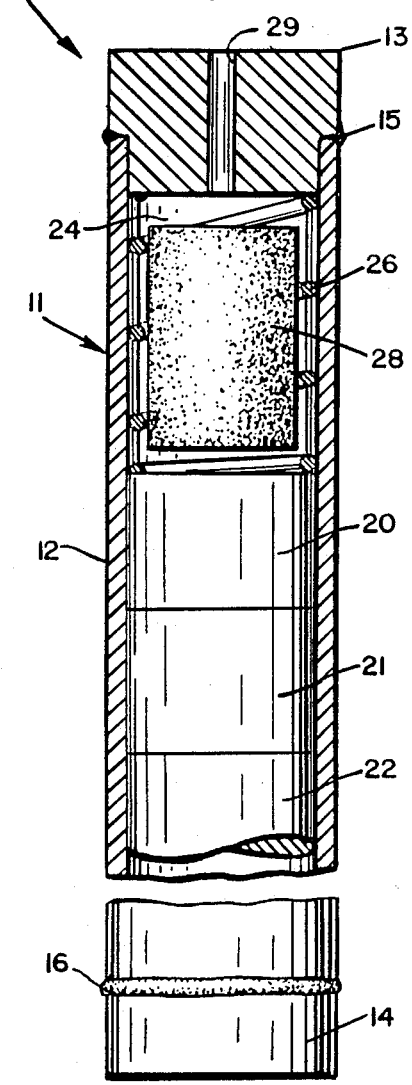

NON-EVAPORABLE TERNARY GETTERING ALLOY, PARTICULARLY FOR THE SORPTION OF WATER AND WATER VAPOR IN NUCLEAR REACTOR FUEL ELEMENTS

This application is a continuation of U.S. application Ser. No. 115,019, filed Jan. 24, 1980, now abandoned.

BACKGROUND OF THE INVENTION

In U.S. Pat. No. 4,071,335 there is described a gettering alloy consisting of the intermetallic compound $Zr_2Ni$ and its use in nuclear reactor fuel elements for the sorption of water and water vapour.

In UK specification No. 1,370,208 there is described, for the same use, a ternary gettering alloy Zr—Ti—Ni able to stoichiometrically sorb water and water vapour without the release of hydrogen.

It is known that nuclear reactor fuel elements normally comprise an outer sheath of a material based on zirconium, within which there are pellets of fuel material, such as $UO_2$. During use of the fuel element within the reactor there is release of water, normally in the form of water vapour, and this water vapour reacts with the components of the tubular sheath material, with the undesirable consequence of a liberation of hydrogen. The reaction between hydrogen and the zirconium of the tubular sheath material of the fuel elements leads to embrittlement and then fracture of the sheath material.

Getter materials used up to the present moment in this field must work at temperatures of at least 350° C. to ensure that during sorption of water and water vapour no hydrogen is liberated. This temperature corresponds to that at which the getter material functions during normal nuclear reactor working. However, during start-up of the reactor and when it works at low out-put, the temperature may be considerably lower. In these conditions, with known getters there is the danger of hydrogen release.

DESCRIPTION OF THE INVENTION

It is a scope of the present invention the provision of a getter material, especially for nuclear reactors, able to sorb water and water vapour, without releasing hydrogen, at temperatures less than 350° C., and that is able to sorb as quickly as possible all the water and all the water vapour that is produced.

It has been found that this object can be attained by a ternary alloy based on zirconium containing the elements titanium and iron.

In fact, it has been found that this ternary alloy Zr—Ti—Fe has advantageous properties in the temperature range from 200° C. to 350° C. when it is used for stoichiometrically sorbing water and water vapour without the release of hydrogen.

The weight ratios of the three compounds of the ternary alloy according to the present invention can vary between wide limits.

Experimental tests have demonstrated that compositions having the following percentages in weight are able to meet the objects of the present invention:

Zr from 45 to 75%
Ti from 5 to 20%
Fe from 5 to 35%

In particular the ternary gettering alloy has a composition which when plotted on a ternary composition diagram in weight percent Zr, weigth percent Ti and weight percent Fe lies within a polygon having as its corners the points defined by (a) 75% Zr—5% Ti—20% Fe
(b) 60% Zr—5% Ti—35% Fe
(c) 45% Zr—20% Ti—35% Fe
(d) 75% Zr—20% Ti—5% Fe as shown in FIG. 9.

The ternary gettering alloys are preferably in the form of a powder having a particle size between $1\mu$ and $500\mu$, and preferably between $25\mu$ and $125\mu$.

In order to illustrate more clearly the advantageous properties of the ternary alloy of the present invention, particularly with reference to its use for the sorption of water and water vapour, without the release of hydrogen, at temperatures less than 350° C., in a nuclear reactor fuel element, reference will be made to several comparative tests made with Zr—Ti—Fe alloy according to the invention having the following nominal compositions: 63,2% Zr—11% Ti—25,8% Fe, and 71% Zr—12,6% Ti—16,4% Fe, with the known ternary alloy 84% Zr—11% Ti—4% Ni (UK specification No. 1,370,208) and with the known alloy $Zr_2Ni$ (U.S. Pat. No. 4,071,335).

An alloy of the present invention was made by taking 31.6 grams of small chips of Zr sponge, 5.5 grams of small chips of Ti sponge and 12.9 grams of Fe granules. The three components were mixed in the air and placed in a water-cooled cold copper crucible as described by A. Barosi in "Residual Gases in Electron Tubes" Ed. T.A.Giorgi and P. della Porta, Academic Press, 1972 pages 221-235. The crucible was maintained in an atmosphere of 500 Torr of argon and the components were melted by high frequency induction heating to form a Zr—Ti—Fe alloy. The fusion was allowed to cool to room temperature and the resulting ingot was broken into small pieces in air, mixed and remelted in the cold copper crucible again in an atmosphere of 500 Torr or argon. Remelting took place a total of five times in order to ensure the production of a homogeneous alloy. After the final cooling the alloy was ground to a particle size of less than $125\mu$. The resulting alloy has a composition of 63.2% Zr, 11% Ti and 25.8% Fe by weight.

Figure 2:
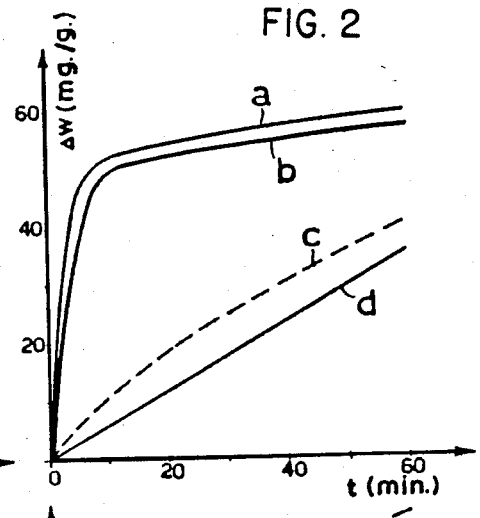
Figure 3:
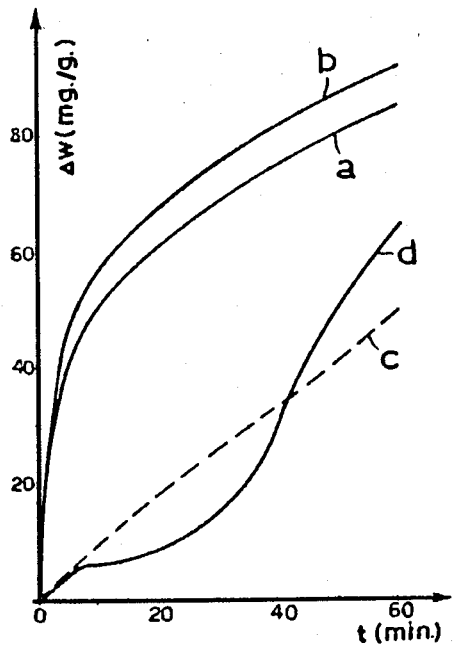
Figure 4:
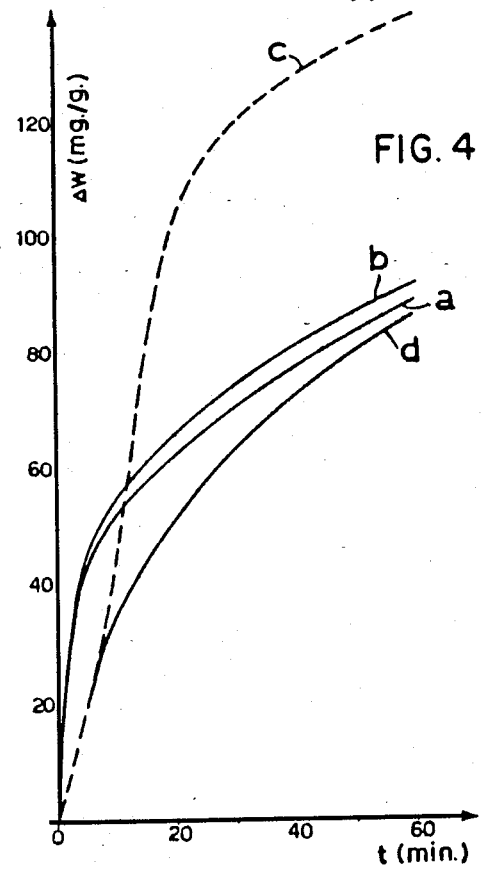
Figure 5:
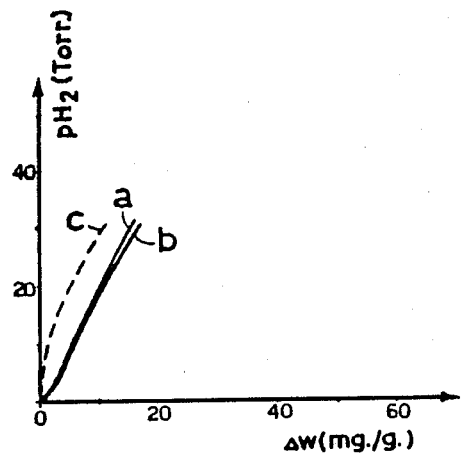
Figure 6:
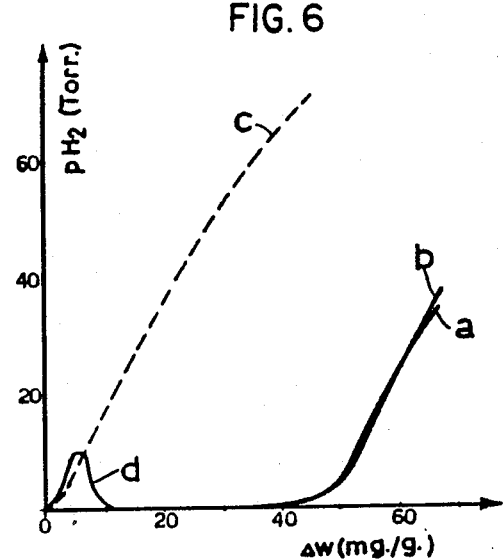
Figure 7:
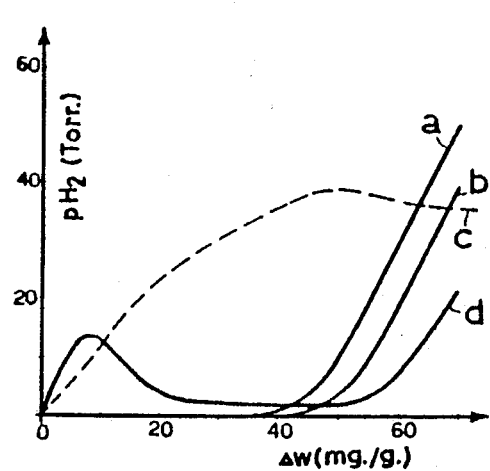
Figure 8:
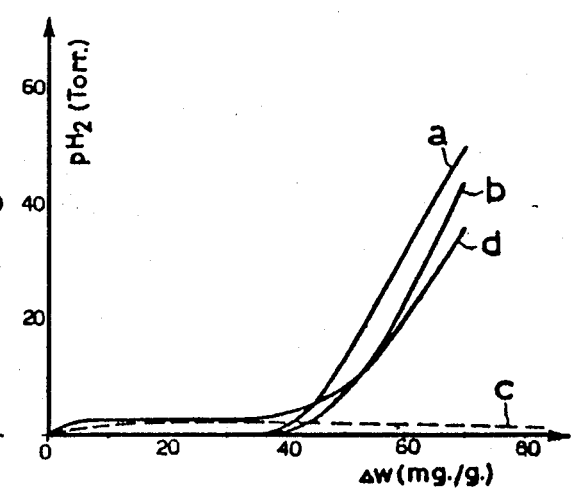

The comparison of the alloy has been carried out in the same way as described in U.S. Pat. No. 4,071,335. For the evaluation of the sorption characteristics for water of the gettering materials the apparatus described and illustrated in FIG. 2 of this USA patent was used. During the measurements the water vapour pressure in the system was maintained at the 0° C. value of 4.6 Torr approximately.

The water vapour sorption properties of the gettering alloys were examined at temperatures of 200°, 250°, 300° and 350° C.

At these temperatures the following measurements were made:

the increase in weight of the getterin alloy in milligrams per gram of alloy as a function of the time in minutes: the results are shown on the graphs given in FIGS. 1 to 4;

the partial pressure of hydrogen in the system in Torr as a function of the increase in weight of the gettering alloy per gram of alloy: the results are shown in the graphs reported as FIGS. from 5 to 8.

In these graphs the two alloys of the present invention are shown by the letters a and b, that relative to Zr—Ti—Ni is indicated with c and that of $Zr_2Ni$ is indicated with d.

The diagrams of FIGS. 1 to 4 show the speed and sorption capacity of the gettering alloys. From these diagrams there can be clearly seen the superiority of the alloys of the present invention with respect to the comparison alloys at low temperatures, less than 350° C. For example, while at 200° C. the Zr$_2$Ni alloy shows no sorption of water and that of Zr—Ti—Ni shows an extremely low sorption, the alloys Zr—Ti—Fe not only show a greater sorption speed but their sorption capacity is greater.

Similar considerations are also valid for the tests at temperatures of 250° C. and 300° C.

In the tests performed at 350° C. it is seen that alloys and b of the present invention again have a higher sorption speed than prior art alloys c and d in the initial stage of sorption, while the known alloy Zr—Ti—Ni (c) shows a higher sorption capacity.

The graphs shown in FIGS. 5 to 8 (the measurements leading to these graphs are made simultaneously with those leading to FIGS. 1 to 4) demonstrate the ability of the getter alloys to retain hydrogen during sorption of water or water vapour. In fact these graphs show the behaviour of the hydrogen partial pressure in the system as a function of the increase in weight of the getter alloy, that is the release of hydrogen as the alloy gradually sorbs more water.

At the lower temperatures (200°, 250°, 300°) the ternary alloys of the present invention releae hydrogen only after hvaing sorbed a certain quantity of water (see particularly FIGS. 6 and 7), while the known alloys release hydrogen very much earlier. It should be noted that in FIG. 5 (200° C.) there is no curve relating to the alloy Zr$_2$Ni as this alloy, at that temperature, does not sorb water.

Even at a temperature of 350° C. (FIG. 8) the ternary alloys of the present invention still perform better than alloys previously known, at least until having reached a certain degree of sorption.

The above has therefore demonstrated the superiority of ternary alloys Zr—Ti—Fe of the present invention with respect to known comparable alloys for use in the nuclear reactors or in similar applications, as far as concerns the ability to sorb water and water vapour, at temperatures lower than 350° C., without release of hydrogen.

In general the method according to the present invention for the stoichiometric sorption of both oxygen and hydrogen from water and water vapour consists substantially of contacting the water with a ternary gettering alloy Zr—Ti—Fe, where the partial pressure of the water is less than 100 Torr, where the gettering alloy has a temperature between 200° and 350° C., where the gettering alloy is able to sorb up to 4% by weight of water, and where the particles of the gettering alloy have a size between 1$\mu$ and 500$\mu$.

It should be borne in mind that the water and water vapour can be mixed with a rare gas, for example helium as is generally the case in nuclear reactor fuel elements.

In this application according to the present invention there is foreseen a nuclear fuel element comprising a container which defines a chamber in which there is contained material capable of a fission reaction and further there is contained a gettering material comprising a ternary alloy of Zr, Ti and Fe.

Referring now to FIG. 10 there is shown a nuclear reactor fuel element 10 of the present invention. The nuclear reactor fuel element 10 comprises a sealed container 11 comprising a tube 12 into which is fitted a first end cap 13 and a second end cap 14. The end caps 13, 14 are held to the tube 12 by means of welds 15, 16. It is the process of forming the welds 15, 16 which frequently heats areas of the tube 12 and making the zirconium present in the tube 12 more receptive to hydrogen embrittlement. Within the tube 12 are a number of pellets 20, 21, 22 of fissionable material such as UO$_2$. The space between the uppermost pellet 20 and the end cap 13 is generally referred to as the plenum 24. Within the plenum 24 is a spring 26. Within the spring 26 is a getter device 28 of the present invention. Alternatively the getter device could be in the position of the pellet 20 or could be present in a recess in the end cap 13.

The Zr—Ti—Fe alloy in the getter device 28 is present as finely-divided particles having a size less than 500 microns. The particles are pressed into a coherent porous mass. During operation of the fuel element 10 the getter device 28 is generally maintained at a temperature of about 200° to 500° C. and during start-up of the reactor and when it works at low output may be maintained for considerable lengths of time between 200° C. and 350° C. In accordance with conventional manufacturing processes the container 11 is filled with helium to an extent such that the total gas pressure in the plenum 24 and in fact in the rest of the container 11 is between 1 and 30 atmospheres. As shown in FIG. 1 the end cap 13 is provided with a passage 29 which is closed prior to use of the nuclear reactor fuel element in a nuclear reactor.

Even though the invention has been described in detail with reference to a preferred embodiment it is intended that variations and modifications can be performed within the spirit and scope of the invention as described and defined in the following claims.

We claim:

1. Method for the stoichiometric sorption of both oxygen and hydrogen from water which consists of contacting water with a non-evaporable ternary gettering alloy of Zr—Ti—Fe.

2. Method according to claim 1, in which the ternary alloy used comprises:
   from 45 to 75% by weight Zr
   from 5 to 20% by weight Ti and
   from 5 to 35% by weight Fe.

3. A method according to claim 1 in which the ternary gettering alloy comprising Zr, Ti and Fe having a composition which when plotted on a ternary composition diagram in weight percent Zr, weight percent Ti and weight percent Fe lies within a polygon having as its corners the points defined by:
   (a) 75% Zr—5% Ti—20% Fe
   (b) 60% Zr—5% Ti—35% Fe
   (c) 45% Zr—20% Ti—35% Fe
   (d) 75% Zr—20% Ti—5% Fe 4. Method according to claim 1, in which the water pressure is less than 100 Torr, the gettering alloy has a temperature between 200° C. and 350° C. and is able to sorb up to 4% by weight of water, and in which the particles of the gettering alloy have a particle size between 25$\mu$ and 125$\mu$.

5. Method according to claim 1 in which water is present in the form of water vapour.

6. Method according to claim 5 in which the water vapour is mixed with a rare gas.

7. Method for the stoichiometric sorption of both oxygen and hydrogen from water which consists of contacting water with a non-evaporable ternary gettering alloy comprising Zr, Ti, and Fe having a composition which when plotted on a ternary composition diagram in weight percent Zr, weight percent Ti and weight percent Fe lies within a polygon having as its corners the points defined by:
(a) 75% Zr—5% Ti—20% Fe
(b) 60% Zr—5% Ti—35% Fe
(c) 45% Zr—20% Ti—35% Fe
(d) 75% Zr—20% Ti—5% Fe;
wherein, the water pressure is less than 100 Torr;
wherein, the gettering alloy has a temperature between 200° C. and 350° C. and is able to sorb up to 4% by weight of water; and
wherein particles of the gettering alloy have a particle size between 25µ and 125µ.

* * * * *